US010175492B2

(12) United States Patent
Li et al.

(10) Patent No.: US 10,175,492 B2
(45) Date of Patent: Jan. 8, 2019

(54) SYSTEMS AND METHODS FOR TRANSITION BETWEEN AUGMENTED REALITY AND VIRTUAL REALITY

(71) Applicant: EON REALITY, INC., Irvine, CA (US)

(72) Inventors: Erbo Li, Mission Viejo, CA (US); Dan Lejerskar, Laguna Beach, CA (US); Yazhou Huang, Mission Viejo, CA (US); Jan Kjallstrom, Monarch Beach, CA (US); Mats Johansson, Trabuco Canyon, CA (US)

(73) Assignee: EON REALITY, INC., Irvine, CA (US)

(*) Notice: Subject to any disclaimer, the term of this patent is extended or adjusted under 35 U.S.C. 154(b) by 0 days.

(21) Appl. No.: 15/800,636

(22) Filed: Nov. 1, 2017

(65) Prior Publication Data
US 2018/0074332 A1 Mar. 15, 2018

Related U.S. Application Data

(63) Continuation-in-part of application No. 15/137,856, filed on Apr. 25, 2016, now abandoned.

(60) Provisional application No. 62/152,621, filed on Apr. 24, 2015.

(51) Int. Cl.
G06F 1/16 (2006.01)
G06F 3/01 (2006.01)
G02B 27/01 (2006.01)
G06T 19/00 (2011.01)
G06F 3/0482 (2013.01)

(52) U.S. Cl.
CPC ..... *G02B 27/0176* (2013.01); *G02B 27/0172* (2013.01); *G06F 1/163* (2013.01); *G06F 3/011* (2013.01); *G06F 3/012* (2013.01); *G06F 3/0482* (2013.01); *G06T 19/006* (2013.01); *G02B 2027/014* (2013.01); *G02B 2027/0138* (2013.01); *G02B 2027/0156* (2013.01); *G02B 2027/0178* (2013.01)

(58) Field of Classification Search
None
See application file for complete search history.

(56) References Cited

U.S. PATENT DOCUMENTS

2003/0210832 A1* 11/2003 Benton .................. G06T 15/20
382/284
2016/0253843 A1* 9/2016 Lee ..................... G06F 3/04815
345/633

* cited by examiner

Primary Examiner — Kee M Tung
Assistant Examiner — Yanna Wu
(74) Attorney, Agent, or Firm — Innovation Capital Law Group, LLP; Vic Lin

(57) ABSTRACT

A display device system providing augmented reality (AR) and virtual reality (VR) displays in the same device and a method for switching between augmented reality and virtual reality modes in the embodiments of the device are disclosed. The system enables users to view an augmented reality setting, interact with objects, and switch to a virtual reality setting or vice versa without having to switch devices. When switching from virtual reality to augmented reality, a shuttering mechanism may open allowing the user to see the real environment within an augmented setting. Position on the user in the physical reality may be tracked relative to position of the user in the AR or VR. Some actions may be triggered based on the tracked location and orientation of the user.

20 Claims, 13 Drawing Sheets

IMAGE PATTERN CHANGE CAUSES SWITCH BETWEEN AR / VR

SYSTEMS AND METHODS FOR TRANSITION BETWEEN AUGMENTED REALITY AND VIRTUAL REALITY

CROSS-REFERENCE TO RELATED APPLICATION

This continuation application claims benefit under 35 U.S.C. § 119(a) of U.S. application Ser. No. 15/137,856 filed on Apr. 25, 2016, which claimed benefit of priority under 35 U.S.C. § 119(e) to U.S. Provisional Application having Ser. No. 62/152621 filed Apr. 24, 2015, which are hereby incorporated by reference herein in its entirety.

FIELD OF THE INVENTION

The present invention relates in general to display systems and methods. More particularly, the invention is directed to systems and methods for transition between augmented reality and virtual reality.

BACKGROUND OF THE INVENTION

Virtual reality and augmented reality systems exist as distinct display systems. Virtual Reality (VR) refers to a machine generated environment that replicates an environment either real or imagined, simulates a user's physical presence inside the machine generated environment, and allows the user to interact with it. Augmented Reality (AR) refers to machine generated sensory content (including but not limited to video, graphics, sound, olfactory, touch and other forms of virtual content) for the purpose of augmenting or supplementing those inside a physical real-world environment, thus modifying by either enhancing or reducing the user's perception of the reality.

While each has its benefits enhancing a user's experience, to date an application must choose between providing the user either a VR or AR based experienced.

Accordingly, a need exists to provide a system that can deliver an integrated VR and AR experience.

SUMMARY OF THE INVENTION

In one aspect, a system for displaying virtual reality (VR) and augmented reality (AR) scenes to a user is disclosed. The system comprises an electronic digital display. A processor in the electronic digital display is configured to: display a VR scene to the user in the electronic digital display, display an AR scene to the user in the electronic digital display, and coordinate switching between the VR scene and the AR scene.

In another aspect, system for displaying virtual reality and augmented reality scenes to a user is disclosed. The system comprises a head mounted unit (HMU). A camera mounted to the HMU. The camera is positioned to capture images of an ambient environment of the user. An electronic digital display is mounted in the HMU. A shuttering mechanism is present in the HMU. A processor in the HMU is configured to: process captured images from the camera, transmit the captured images of the ambient environment to the electronic display, display an AR scene to the user in the electronic display, the AR scene incorporating electronically synthesized objects integrated into captured images of the ambient environment, and display a VR scene to the user in the electronic display. The shuttering mechanism blocks captured images of the ambient environment from the electronic display during display of the VR scene. The processor is further configured to coordinate switching between the VR scene and the AR scene via operation of the shuttering mechanism.

In yet another aspect, a method of displaying virtual reality and augmented reality scenes to a user viewing a digital display is disclosed. The method comprises displaying a VR scene to the user through the digital display; displaying an AR scene to the user through the digital display; detecting by a processor whether the user is being displayed the VR scene or the AR scene in the digital display; and coordinating, by the processor, switching between display of the VR scene and the AR scene in the digital display.

In yet another aspect, a system for displaying virtual reality (VR) and augmented reality (AR) scenes to a user in a physical environment is disclosed. The system comprises an electronic digital display and a depth sensor coupled to the electronic display. A processor in the electronic digital display may be configured to: display a VR scene to the user in the electronic digital display, display an AR scene to the user in the electronic digital display, calculate from data detected by the depth sensor, a position and an orientation of the user within the physical environment relative to a position of the user within the VR scene or AR scene; and trigger switching between the VR scene and the AR scene based on the calculated position and calculated orientation data of the user within the physical environment relative to a predetermined position of the user within the VR scene or AR scene.

In yet another aspect, a system for displaying virtual reality (VR) and augmented reality (AR) scenes to a user is disclosed. The system comprises a head mounted unit (HMU) and a camera mounted to the HMU. The camera is positioned to capture images of an ambient environment of the user. In addition, an electronic display is mounted in the HMU. A shuttering mechanism is present in the HMU. And a processor in the HMU is processor configured to: process captured images from the camera, transmit the captured images of the ambient environment to the electronic display, display an AR scene to the user in the electronic display, the AR scene incorporating electronically synthesized objects integrated into captured images of the ambient environment, display a VR scene to the user in the electronic display, wherein the shuttering mechanism blocks captured images of the ambient environment from the electronic display during display of the VR scene, coordinate switching between the VR scene and the AR scene via operation of the shuttering mechanism, detect whether a user's location is within proximity of one of the electronically synthesized objects in the AR scene, and trigger display of a virtual menu including user commands, within the AR scene in response to detection of the user's location within proximity of one of the electronically synthesized objects in the AR scene.

In yet another aspect, method of displaying virtual reality (VR) and augmented reality (AR) scenes to a user viewing a digital display is disclosed which, comprises displaying a VR scene to the user through the digital display; displaying an AR scene to the user through the digital display; detecting by a processor whether the user is being displayed the VR scene or the AR scene in the digital display; calculating from image data received by a camera and orientation data received from an orientation sensor coupled to the digital display, a position and an orientation of the user within the physical environment relative to a position of the user within the VR scene or AR scene; and triggering, by the processor, switching between display of the VR scene and the AR scene in the digital display based on the calculated position and calculated orientation data of the user within the physical environment relative to a predetermined position of the user within the VR scene or AR scene.

These and other features and advantages of the invention will become more apparent with a description of preferred embodiments in reference to the associated drawings.

DETAILED DESCRIPTION OF THE PREFERRED EMBODIMENTS

The following preferred embodiments, in general, are directed to immersive, virtual reality (VR) and augmented reality (AR) environments displayable within a single device. A system integrates VR and AR environments into a single display system so that the user may switch between environment types without having to switch equipment. Depending on the environment type, the user may witness/interact with digitized objects as part of a real landscape or may be immersed within a completely synthesized landscape, also complete with interactive features. Typical AR environments require the user to see the ambient environment and thus require real time display of objects in the immediate surroundings. However, conventional VR displays are completely synthesized within a closed field of view and thus, any light or imaging from the exterior of the VR display may interfere or interrupt the VR effect. As such, the field of AR and VR systems has not been able to work together within the same device. To date, users required a device dedicated to either AR or VR for a given application. Aspects of the embodiments disclosed herein integrate the AR and VR technologies for a single system that provides users the functionality to switch between AR and VR environments without having to switch between two pieces of equipment.

Figure 1:
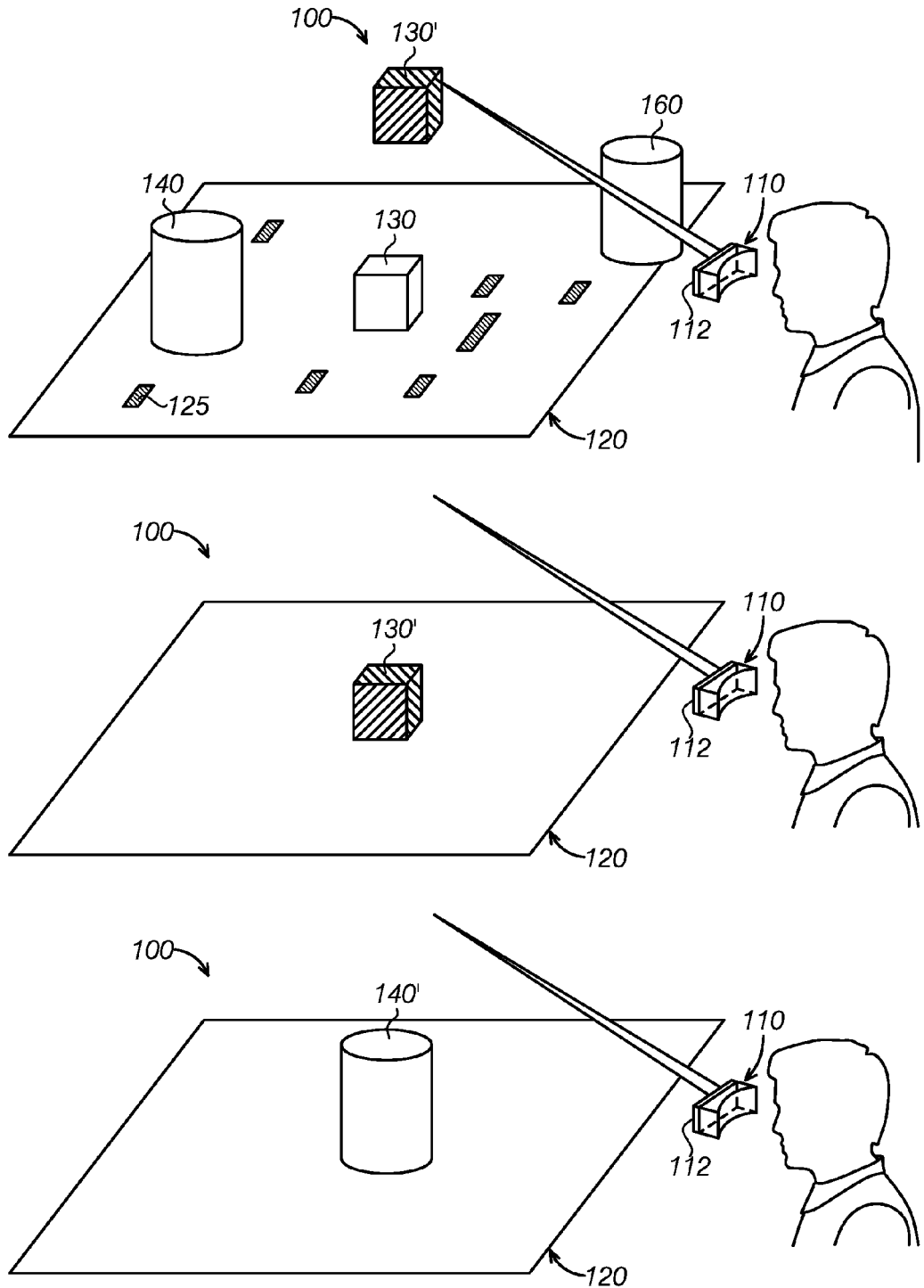
FIG. 1 is a schematic of a user viewing a landscape switching between augmented reality to virtual reality through an exemplary display device in an embodiment of the subject technology.

Referring now to FIG. 1, a system 100 for displaying VR and AR scenes to a user is shown according to an exemplary embodiment. The system 100 includes a display device 110 displaying an AR or VR landscape 120. In some embodiments, the display device 110 is a handheld device 112 (for example a smart phone or tablet) or may be a head mounted unit (HMU) (including wearable devices such as smart glasses). In some embodiments the handheld device 112 may be attached to the HMU forming an overall device 110. The HMU may be equipped with a semi-transparent electronic display but not necessarily a camera. The semi-transparent electronic display may include a projection mechanism which may comprise miniature projectors that project a synthesized virtual scene, while still allowing the user's eyes to see the real world environment through the projection mechanism, with the virtual scene appearing as though it is overlaying on top of the real world environment, forming an AR scene. The semi-transparent electronic display may include a semi-transparent display panel such as OLED and LCD that displays a synthesized virtual scene, while still allows the user's eyes to see the real-world environment through the projection mechanism, with the virtual scene appeared to be overlaying on top of the real-world environment, forming an AR scene. A shuttering mechanism in this setting controls the opacity of abovementioned semi-transparent electronic display, which may be activated to block the user from seeing the ambient environment.

The landscape 120 represents the scene displayed to the user through the display device 110. Within the landscape 120, the user may see a plurality of objects (130, 140, and 160). In AR mode the objects may be real objects either seen through a display as described above or captured through digitized imaging of the ambient environment. In the VR mode, the objects may be fully synthesized digitally. The landscape 120 may include image markers 125 providing reference points along an X-Y plane which may help the system 100 identify relative spacing and movement of objects. In either the AR or VR mode, the objects may be interactive allowing the user to select an object, manipulate an object, or alter the object's physical appearance. In an exemplary embodiment, some interactions may trigger a switch between the AR mode to the VR mode and vice versa. For example, as shown the user may interact with object 130 (a cube). Interaction with the cube 130 (represented by a change in surface shading and shown as cube 130') may trigger a switch from AR mode to VR mode (illustrated in the bottom picture). Object 140 is now shown in a VR scene as a fully synthesized cylinder 140'. In an exemplary embodiment, there is a shuttering mechanism incorporated into the device 110 (or in variations of embodiments described below) that controls imaging between the AR and VR modes.

Figure 2A:
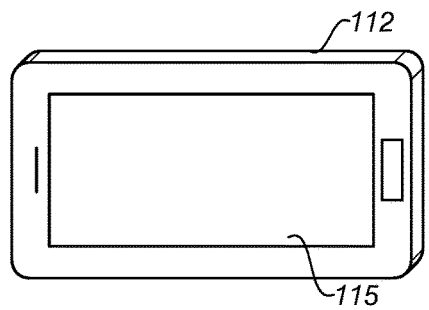
FIGS. 2A and 2B are front and rear views of a handheld display device according to an embodiment of the subject technology.
Figure 2B:
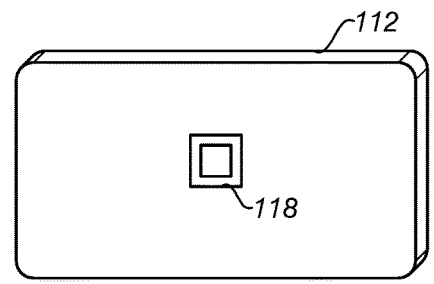
Figure 2C:
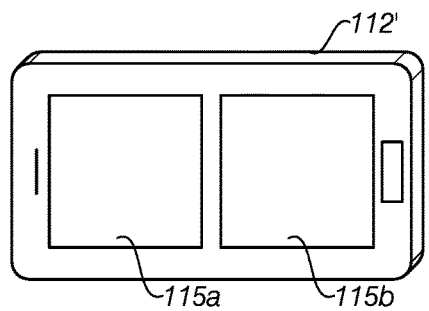
FIGS. 2C and 2D are front and rear views of a handheld display device according to another embodiment of the subject technology.
Figure 2D:
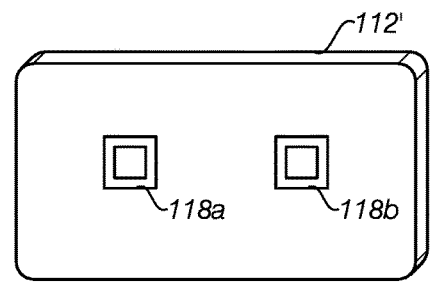
Figure 2E:
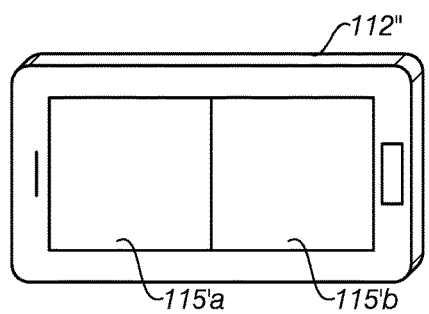
FIG. 2E is a front view of a handheld display device according to another embodiment of the subject technology.
Figure 2F:
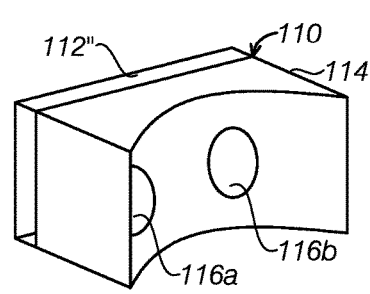
FIG. 2F is a front view of a head mounted unit according to another embodiment of the subject technology.

Referring now to FIGS. 2A-2E, various embodiments of a handheld device 112 are shown from front and rear views. In FIGS. 2A and 2B, the handheld device 112 may include a single display area 115 and a single video camera 118. Images captured by the camera 118 may be processed and used to re-create an AR scene on the display 115. FIGS. 2C and 2D show a handheld device 112' similar to the one shown in FIGS. 2A and 2B except that dual displays $115_a$ and $115_b$ and dual cameras $118_a$ and $118_b$ may be used. Each screen displays the video feed from one of the corresponding video cameras $118_a$ and $118_b$ which may be separated at a known or predetermined distance. Live video feed imaging is shown so that the user sees stereoscopic video feed through the dual-camera, dual-screen setup. FIGS. 2E and 2F show an embodiment of a handheld device 112" using a split screen display 115' split into display screens $115'_a$ and $115'_b$. The handheld device 112" may be attachable onto HMU housing 114 with dual eye ports to view stereoscopic imagery provided by one or more cameras 118 (not shown) on the opposite side of the handheld display device 112". In some embodiments, the content displayed on the screen may be split in half, with the left side of the screen displaying the video feed from the left side video camera, the right side of the screen display the video feed from the right-side video camera. The content displayed on the screen 115' may be split in half, with both the left side of the screen and the right side of the screen displaying the same video feed from a single video camera.

Figure 3A:
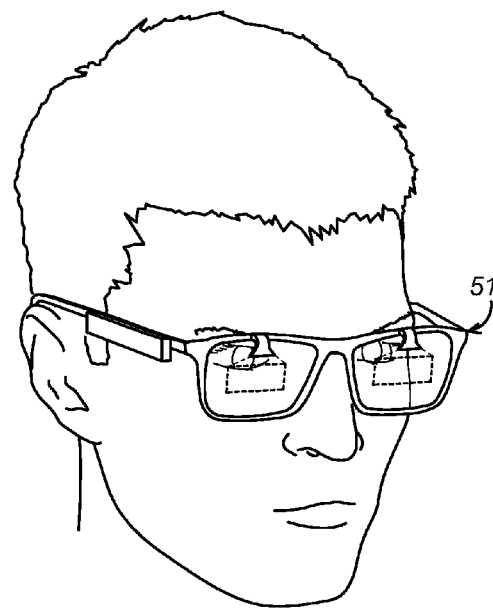
FIG. 3A depicts a perspective front view of a display device in wearable glasses form being worn by a user according to another embodiment of the subject technology.
Figure 3B:
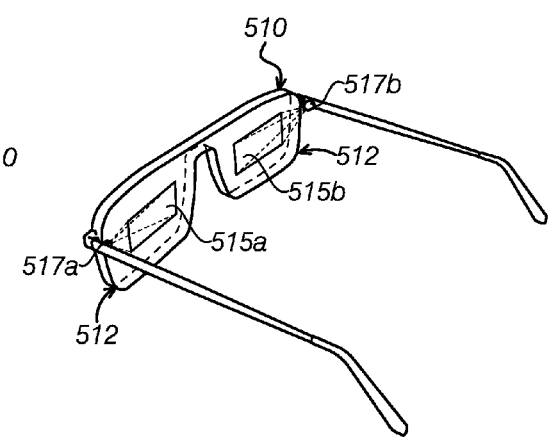
FIGS. 3B and 3C a rear view and front view respectively of the device of FIG. 3A off the user.
Figure 3C:
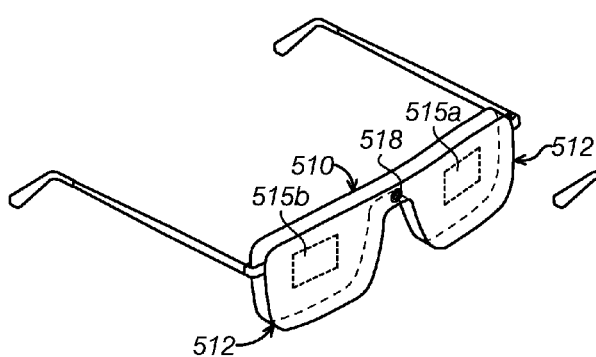
Figure 3D:
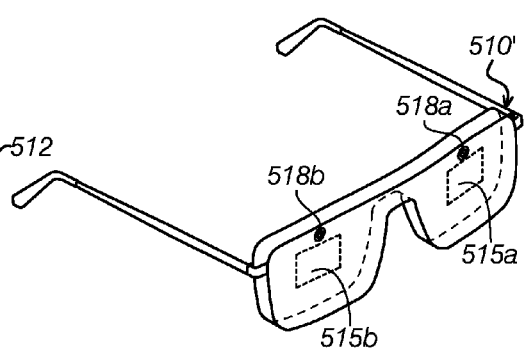
FIG. 3D is a front perspective view of a display device in wearable glasses form according to another embodiment of the subject technology.

Referring now to FIGS. 3A-3D, a display device 510 is shown according to another exemplary embodiment with variations thereof. The device 510 may be a wearable piece of computing equipment, for example smart glasses. The device 510 may include lenses 512 for each eye. The lenses 512 may have adjustable transparency as described in detail further below. Some embodiments may include a single camera 518 (as shown in FIG. 3C) or multiple cameras ($518_a$ and $518_b$) (as shown in FIG. 3D). The device 510 may also include a projector 517a and 517b positioned proximate each lens 512 projecting images. The projected images may be captured by camera(s) 518. Projectors 517a and 517b may project images either onto semi-transparent surfaces on or within the lenses, or directly project into user's eyes in a way known as retinal projection. The lenses 512 may include a semi-transparent display panel displaying images. In operation, AR or VR images are shown on displays 515a and 515b.

Figure 4:
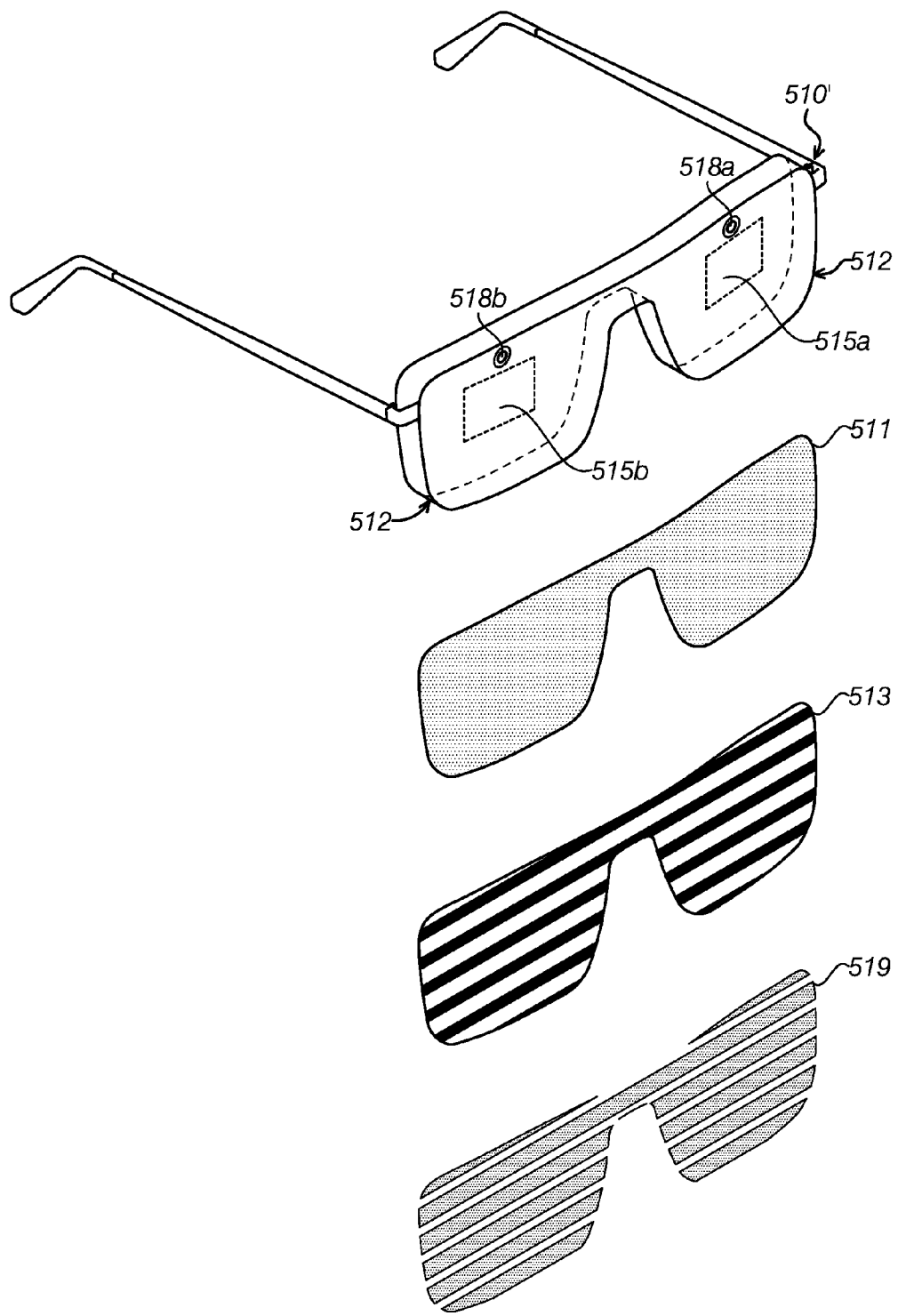
FIG. 4 depicts a display device in wearable glasses form with states of a shuttering mechanism incorporated into embodiments of the subject technology.
Figure 5:
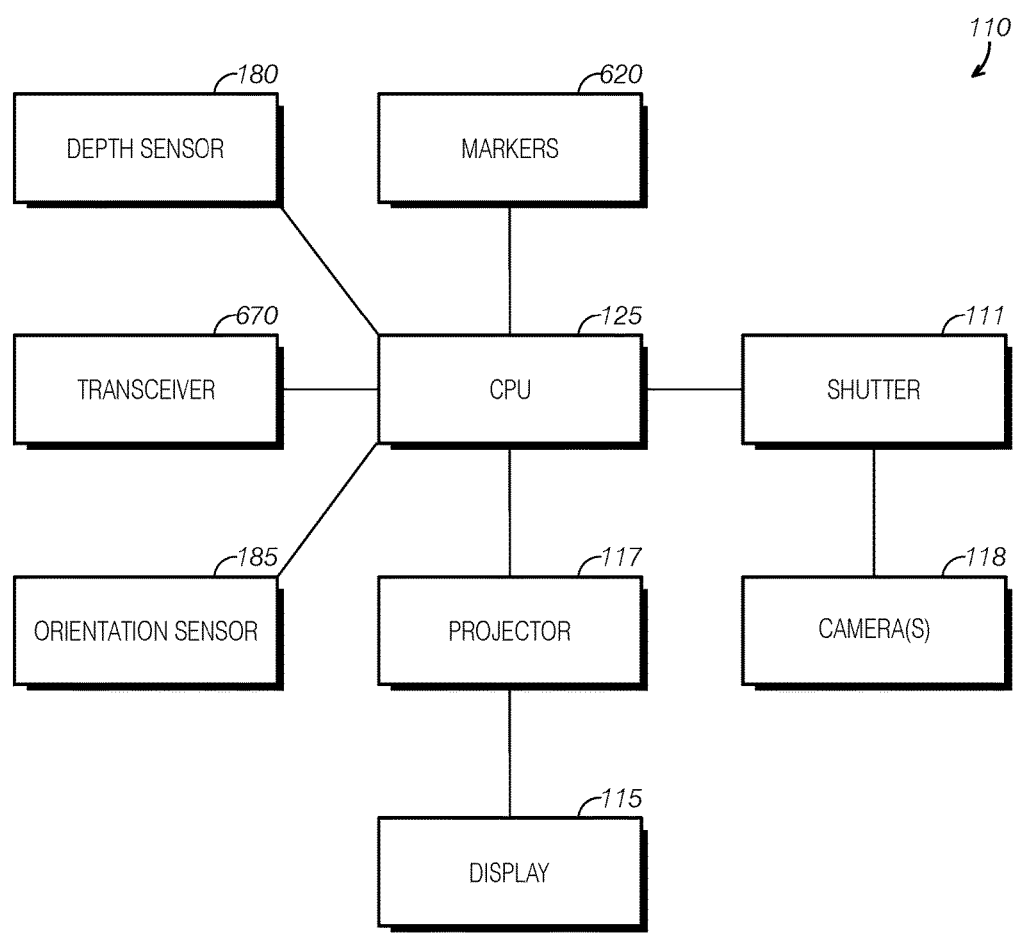
FIG. 5 is a block diagram of electrical components and their connections according to embodiments of the subject technology.

Referring now to FIGS. 2A-2F and 3A-3D concurrently with FIGS. 4 and 5, exemplary embodiments of a shuttering mechanism 111 integrated into the devices 110 or 510 are shown. FIG. 4 shows physical embodiments of a shuttering mechanism 111. FIG. 5 shows a block diagram of the electrically connected components in device 112. As will be understood, a processor 125 may be integrated within the housing of device 110, device 112, or 510, typically onto a PCB and connecting the components shown in FIG. 5 by one or more busses as is known in the art.

The shuttering mechanism 111 may be for example, control of shuttering lenses 512 by the processor 125 to transform from opaque (for example as represented by schematic 511) to transparent as shown in FIGS. 3A-3D. In an exemplary embodiment, the operation of the shuttering mechanism 111 may be based on a calculated position and an orientation of the user within the physical environment relative to a position of the user within the VR scene or AR scene. For example, image data from the camera 118 and sensory data from a depth sensor 180 and/or an orientation sensor 185 may be provided to the processor 125 which may calculate the location and direction which the user is facing within the AR or VR scene. In addition, the position and orientation of the user in the AR or VR scene may be extrapolated relative to the physical environment in which the user is physically moving within. As may be appreciated, this allows the user to experience consistency in the physical environment when switching from VR mode back to AR mode. The shuttering lenses 512 may be for example liquid crystal active shutter glasses. In operation, during the AR mode, the lenses 512 may be transparent or semi-transparent allowing the user to directly see the ambient environment. The processor 125 may also digitize objects which may be projected or displayed onto the user's field of view to provide an augmented reality. Thus, the user's field of view may appear nearly wholly real via being able to see the actual environment and the user's proximate surroundings with digital objects incorporated therein. To switch to or activate the VR mode, the processor 125 may send a signal to the lenses 512 to darken and block out the surrounding field of view. The display 115; 515 may produce a wholly synthesized display of digital objects thus immersing the user into a VR scene. In another embodiment, the shuttering mechanism 111 is a mechanical visor which may either be always opaque (for example as shown by schematic 511) or may include mechanically controlled mini shutters (controlled for example by motors or MEMS components) which may be opened and closed by processor 125 (as represented in schematics 513 and 519). Opened mini shutters is associated with the AR mode and closed mini shutters is associated with the VR mode as described above.

Figure 6:
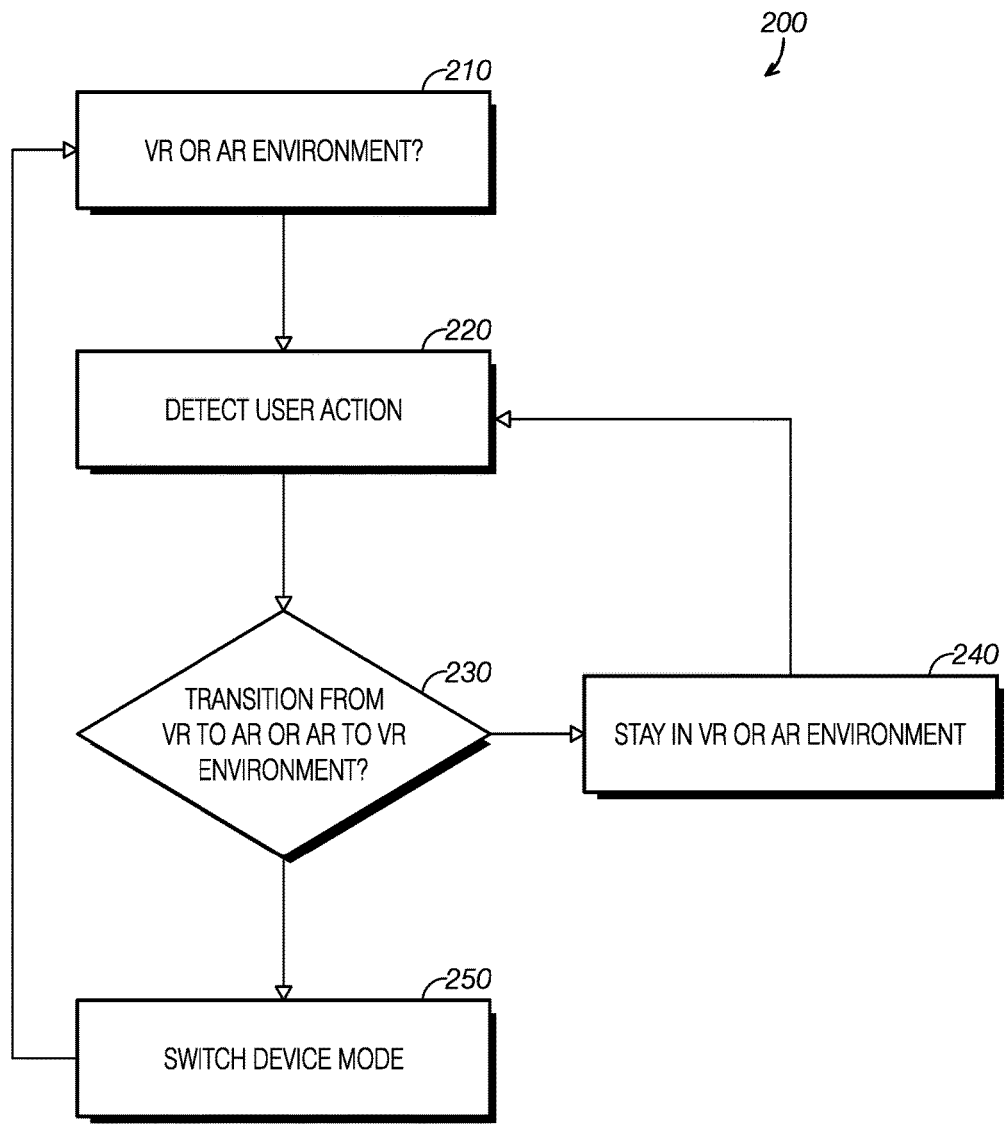
FIG. 6 is a flowchart of a method for displaying virtual reality and augmented reality scenes to a user through a digital display according to an embodiment of the subject technology.

Referring now to FIG. 6, a method 200 of displaying VR and AR scenes to a user wearing a head mounted unit (HMU) is shown according to an exemplary embodiment. It will be understood that the blocks referenced by numerals in parenthesis below represent actions performed by a computing processor unless otherwise stated. As threshold steps, the HMU is generally already powered on and may be in use. A determination of whether the unit is displaying an AR or VR scene is performed (210). While the user is experiencing the AR or VR scene, does the system detect (220) a user action. In response to a user action being detected, a determination (230) may be made whether the user action belongs to one of a stored number of actions flagged to indicate transitioning from display of a VR scene to an AR scene or vice versa. User actions may include user input commands, changes of user/device position, location, orientation, and acceleration of the device. The changes in position, location, orientation, and acceleration may be translated by the processor in relation to interaction with virtual objects (for example menus of user selected commands or virtualized physical objects such as doors, handles, etc.) activated within VR or AR scenes. The device moves in a synchronized fashion with the user, and the user may physically change position, location, orientation and acceleration along with the device inside the physical world, and the machine generated VR and/or AR content may change accordingly with the changes of user's location.

Figure 6A:
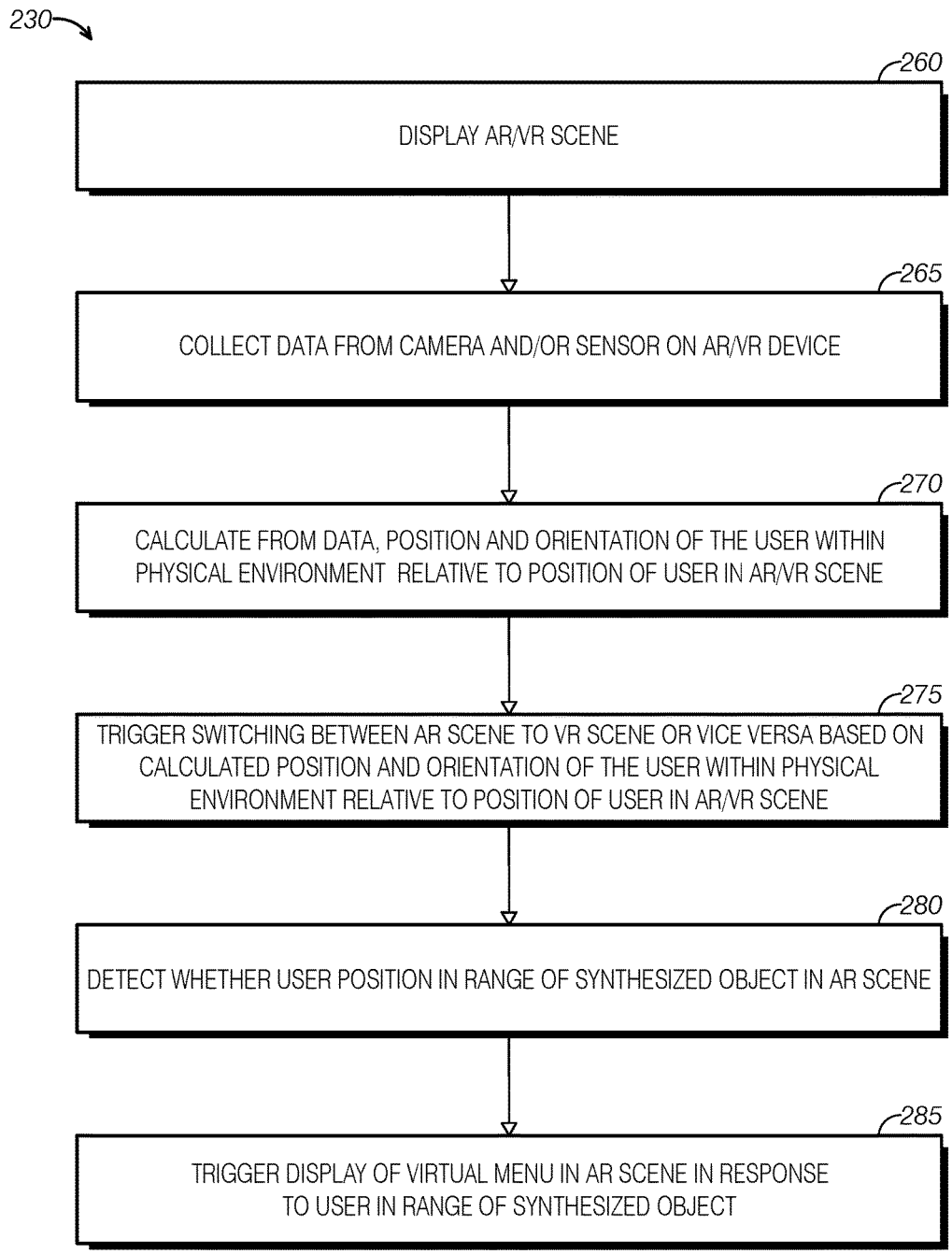
FIG. 6A is a flowchart of a sub-process for detecting user position and user triggered action based on position according to an embodiment of the subject technology.

Referring temporarily to FIG. 6A, the sub-process 230 of FIG. 6 may be described in more detail. In the sub-process 230, the determination of whether to switch from an AR scene to a VR scene or vice versa may be based on user location. In addition, other actions may be triggered as a result of determining the user's location in the VR/AR environment and/or the real-world location. For example, the system may be currently displaying (260) either the AR or the VR scene. As the user is engaged in the AR or VR scene, data from the system's camera and/or sensor(s), (for example, acceleration, depth and/or orientation sensors) may be collected (265) by the processor. The data may track the user's movement, position, and changes of orientation in the physical environment. The user's movement in the physical environment may not be step for step proportional to the user's perceived movement in the AR or VR environment. The processor may calculate (270) from the collected data, position and orientation of the user within physical environment relative to the position of user in AR/VR scene or vice versa. In response, if the user is detected to be in one or more predetermined or calculated locations (whether in the real-world or synthesized environments), the system may trigger a follow-up action. For example, the system may trigger switching (275) between the AR scene to the VR scene or vice versa based on the calculated position of the user within the physical environment relative to the position of the user in the AR/VR scene. In addition to the scene switch above, or as a different action, if the user's calculated position in an AR scene is detected (280) to be within range of a synthesized object, then the process may trigger display (285) of a virtual menu in the AR scene (see for example, FIGS. 8, 8A, and 8B below).

Referring back to FIG. 6 and method 200, if the user action is not flagged, then the current display of a VR scene or AR scene is maintained (240) and the method 200 continues to monitor detection of user actions in block (230). If the user is flagged, then the unit may switch the current VR scene to AR mode or current AR scene to VR mode depending on the type of scene determined in block 210. If the scene determined in block 210 was an AR scene, a shuttering mechanism may be closed to block out light from the ambient environment and a display on the unit may show a wholly synthesized digital scene for the VR scene when switched over. If the scene determined in block 210 was VR scene, a shuttering mechanism may be opened to allow light from the ambient environment into the user's field of view and the unit may display an AR scene when switched over.

The system detection (220) being referenced in FIG. 6 may be designed to monitor a plurality of detectable user actions. It may include but not limited to: user's hand movement, body movement and/or event sent from a hand-held controller or wearable controller, voice command, and body conditions of the user, as described in detail further below.

Figure 7A:
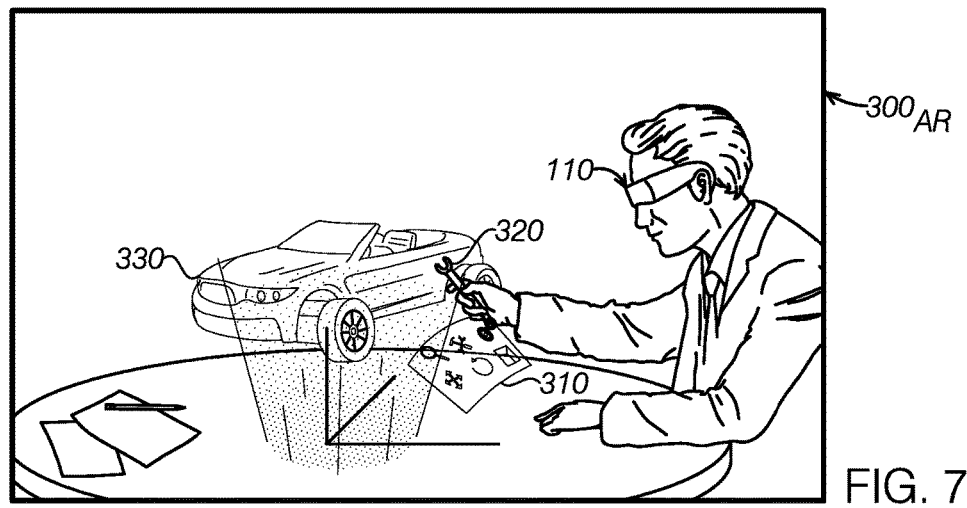
FIG. 7A illustrates a user interacting with an augmented reality scene while wearing a display device according to an embodiment of the subject technology.
Figure 7B:
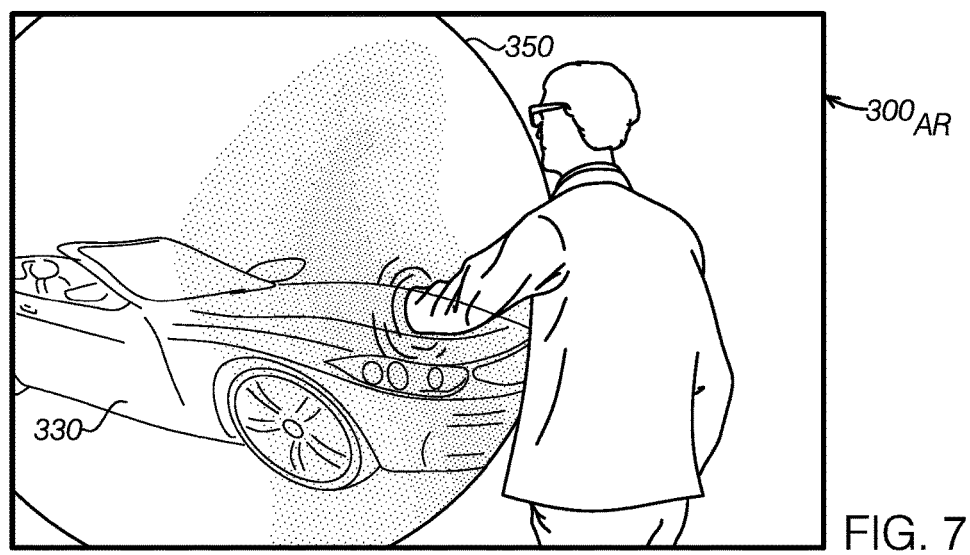
FIG. 7B illustrates a user moving to a virtual boundary area in the augmented reality scene of FIG. 7A.
Figure 7C:
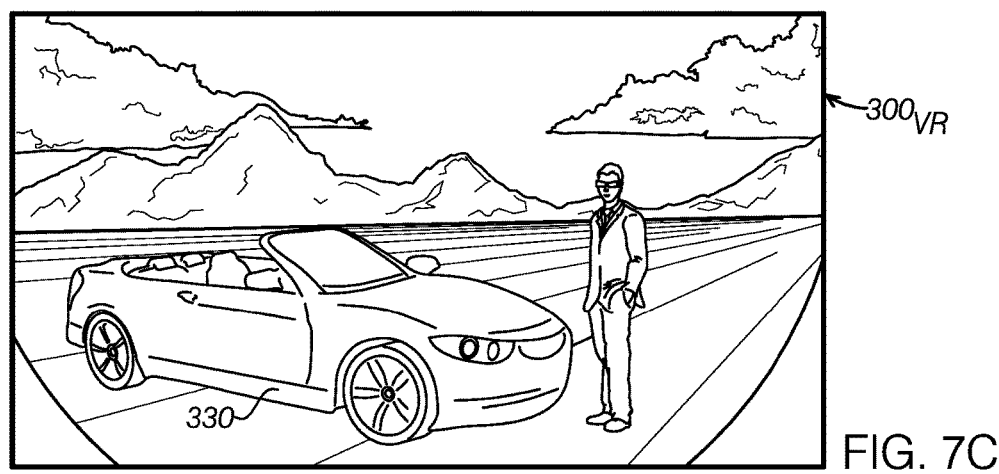
FIG. 7C illustrates a user triggering a switch to a virtual reality scene in the display device triggered by entering the virtual boundary area of FIG. 7B.

Referring now to FIGS. 7A-7C, operator use of the display device 110 is shown according to exemplary applications. In FIG. 7A, the user wearing device 110 is engaged in an AR scene $300_{AR}$ generated by the device 110. In the description that follows, the user will interact with a virtual car being able to fix/modify the car using aspects of the subject technology described above. However it will be understood that other application may operate in the same manner. The AR scene $300_{AR}$ is shown superimposed onto the user's physical ambient environment. As shown, the user is sitting by a physical table inside a physical office room. In reality, the table has nothing on it. The office has no window and the walls have nothing on them. The device 110 starts in AR mode and the user sees his/her physical hand, the physical table and the physical walls through the display device 110. In embodiments using a shuttering mechanism, the shutter is open (or lenses signaled for transparency). The user may start a virtual work session, and a virtual car model 330 is synthesized by the device 110 and appears on top of the physical table. The user may activate a virtual menu 310 which may have an option to display other virtual objects. For example, the user may be provided one or more virtual tools 320 scattered around within reach. The display device 110 tracks the movement of user, for example the user's hand and head. The user grabs the virtual tools 320 needed by his/her physical hand and starts working on the virtual car model 330 in a virtual design session.

In some embodiments, the user's location in the AR or VR scene may trigger a transition from one scene type to the other scene type. In some embodiments, locations triggering a responsive action may be pre-defined in the scene by a virtual boundary. For example, upon finishing the design, the user may wish to see the virtual car model 330 up close. As shown in FIG. 7B, the user may stand up and physically walk away from the table into a virtual bubble 350 representing a location boundary. Entering the virtual bubble 350 may be flagged by the system to trigger a switch from displaying the AR scene $300_{AR}$ to a VR scene $300_{VR}$ as shown in FIG. 7C. By switching to VR mode, the user's field of view is switched to a synthesized digital scene which may or may not include a resemblance to the scene visible in the previous AR scene $300_{AR}$. In embodiments using a shuttering mechanism, the shutter is closed (or lenses may opaque) to block the view of the ambient environment including for example view of the table and surrounding physical objects.

As shown in FIG. 7C, the VR scene $300_{VR}$ is completely different than the AR scene $300_{AR}$. The VR scene $300_{VR}$ may be completely immersive as displayed electronically to the user. For example, the virtual car model 330 may be scaled up to its true scale right in front of the user. The user may walk around the car and take a close look at it, manipulate it, open the door and look inside the interior, etc. as displayed to the user through the device 110. In real space, the user may be physically walking around the office and the device 110 determines the location of the user and updates the machine generated content accordingly. The user may trigger a menu function to revert back to AR mode again, walk back to the physical table, and work further in the AR scene $300_{AR}$ to improve the car design.

Figure 8:
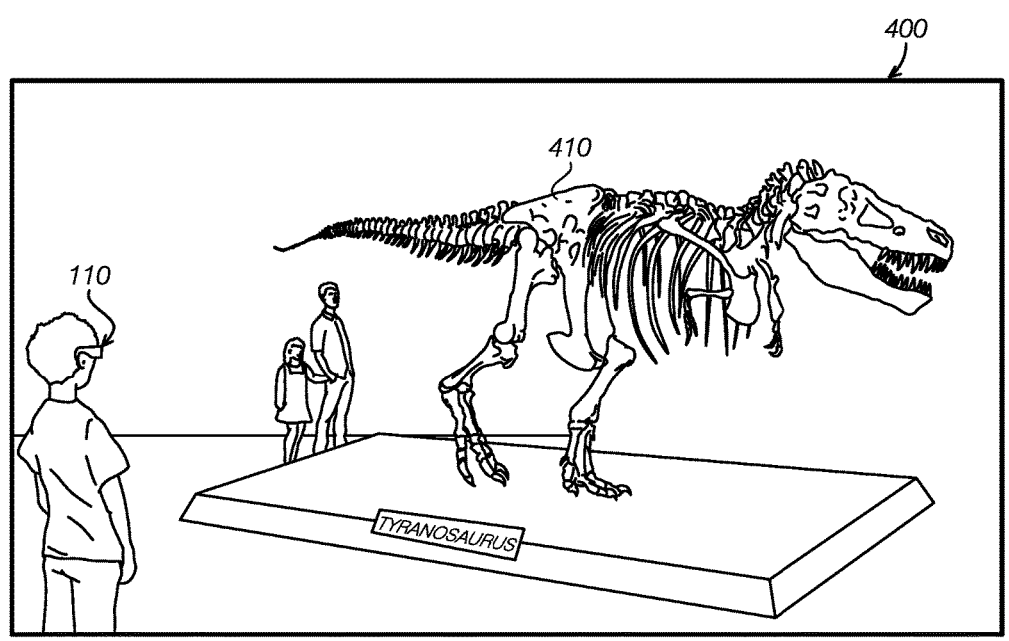
FIG. 8 illustrates a user wearing a display device according to embodiments of the subject technology prior to interacting with an exhibit.
Figure 8A:
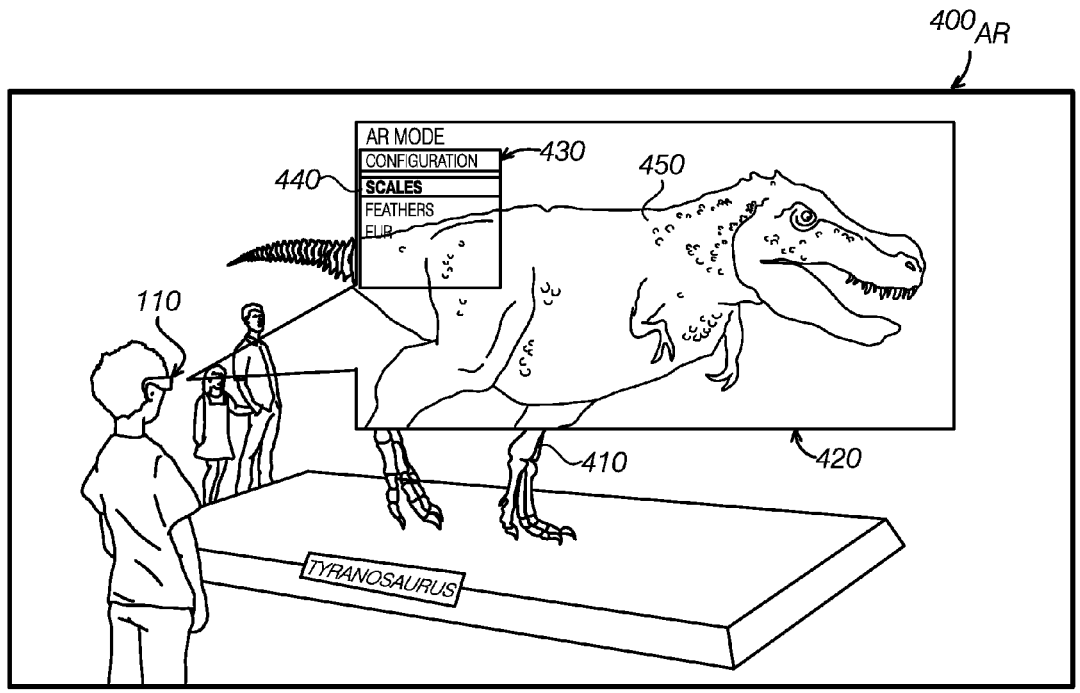
FIGS. 8A-8D illustrate a user interacting with a menu in an augmented reality scene to change the appearance of a virtual object and switch to a virtual reality scene according to embodiments of the subject technology.
Figure 8B:
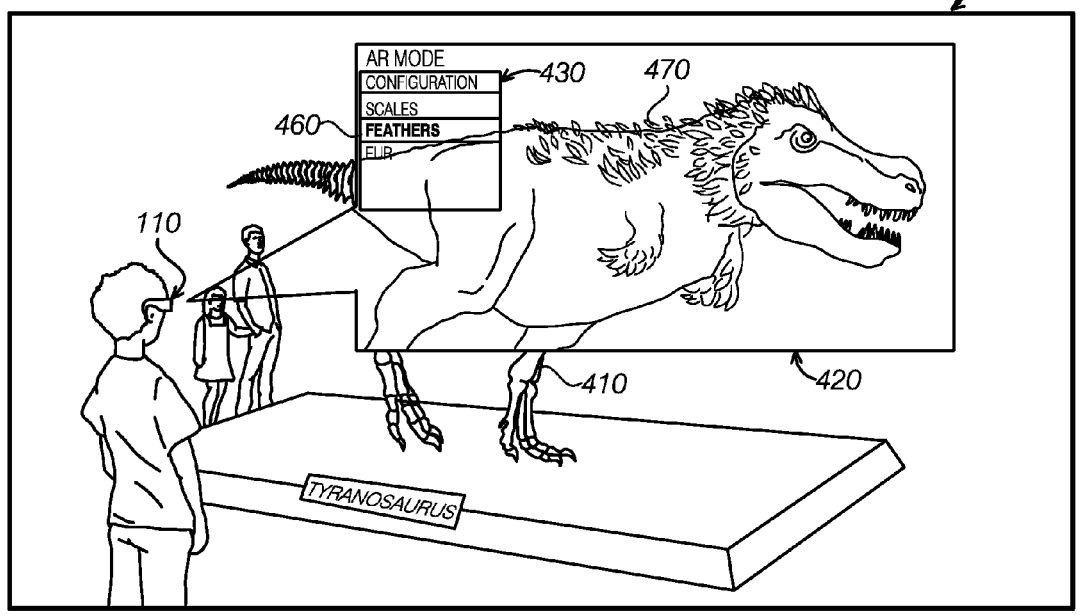
Figure 8C:
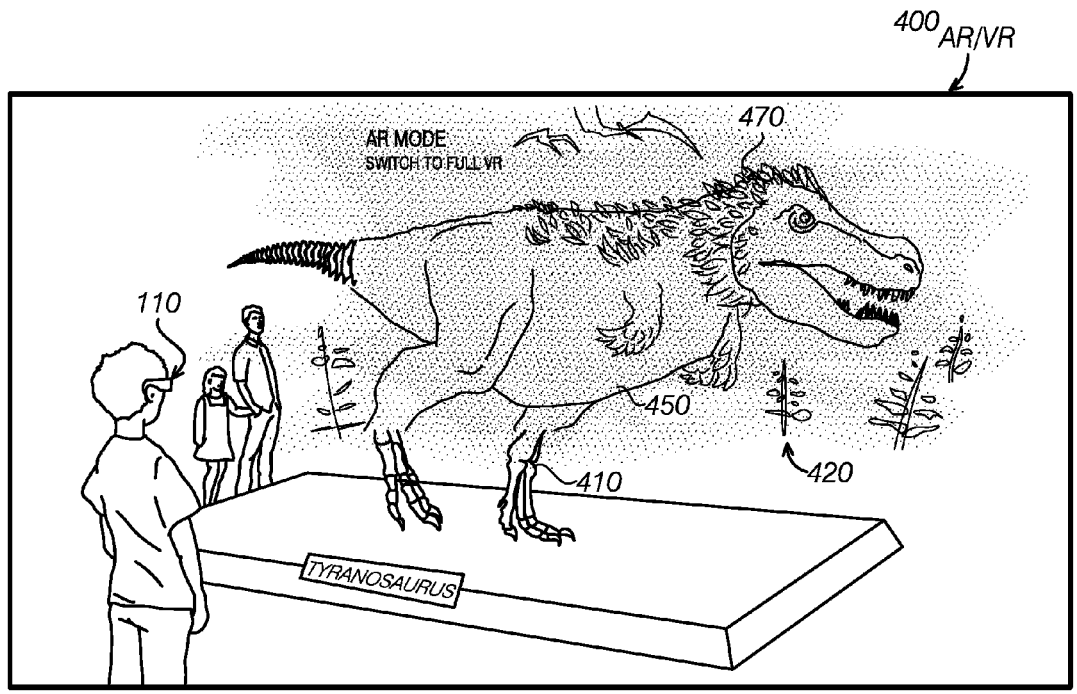
Figure 8D:

FIGS. 8 and 8A-8F show another exemplary application with additional features available through the subject technology. In this exemplary application of the device 110, a user may explore information about an inanimate object whose appearance and background are enhanced by the dual availability of VR and AR modes in the device 110. For example, as shown in FIG. 8, within a museum setting, a user wearing the device 110 arrives in a real-life scene 400 in front of an exhibit of a dinosaur skeleton 410. In FIG. 8A, an AR scene $400_{AR}$ may be triggered upon the user arriving at the location of the exhibit 410 and the system detecting a direction of view or by object recognition as picked up by for example, a camera 118 (FIG. 2B). VR or AR displays associated with the subject may be pre-stored onto a memory storage module in the device 110 (or firmware of the processor). The AR scene $400_{AR}$ may display within field of view 420, a virtual replication 450 of the dinosaur associated with the skeleton 410. The field of view 420 may be adjustable depending on electronic settings to zoom in/out or depending on the distance of the user from an object. A virtual menu 430 may be provided within the field of view 420 showing selectable actions for the user. For example, the menu 430 may have selections for various features superimposed on or appearing as the digital skin of the virtual replication 450 of the dinosaur. This may provide for example, showing in practice various theories associated with a subject. For example, the user selects feature 440 which creates the appearance of scales for the dinosaur skin. FIG. 8B shows selection of feature 460 which creates a skin of feathers 470 on the virtual replication 450 of the dinosaur. FIG. 8C shows a transition scene $400_{AR/VR}$ which may gradually switch the scene from AR to VR mode. Note the other people present in the scene while background digitally synthesized imagery begins to appear in the field of view 420. This may represent for example, a shuttering mechanism gradually blocking out ambient light as the device 110 switches from AR to VR mode. Once the ambient environment is blocked out from the field of view 420, the device 110 may immerse the user within a VR scene $400_{VR}$ (FIG. 8D) placing the user within a synthesized digital environment displaying a virtual rendition $410_{VR}$ of the dinosaur within for example a pre-historic setting. The scene may be switched from VR back to AR mode. This switch may be achieved for example by user's activation via the virtual menu 430. This switch may be automated based on positional changes of the device 110, for example upon the user leaving the location where the dinosaur skeleton 410 is exhibited.

Figure 8E:
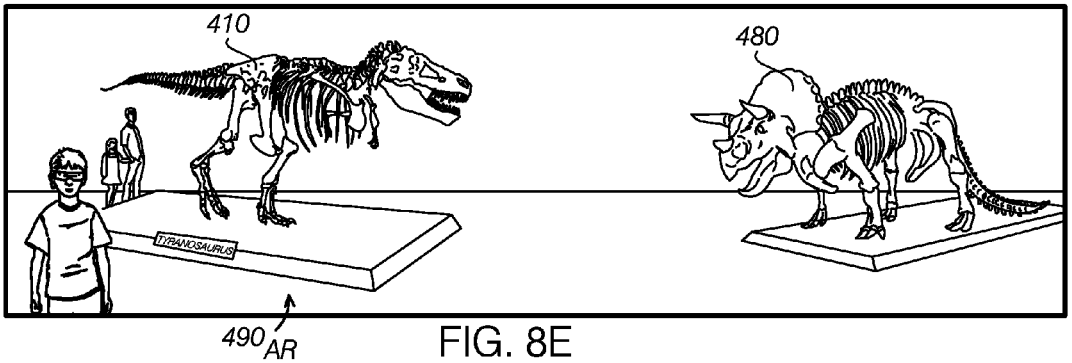
FIGS. 8E-8H illustrate a user using the display device of FIG. 8 to manipulate two separate exhibits to interact with each other in AR mode and VR mode according to embodiments of the subject technology.
Figure 8F:
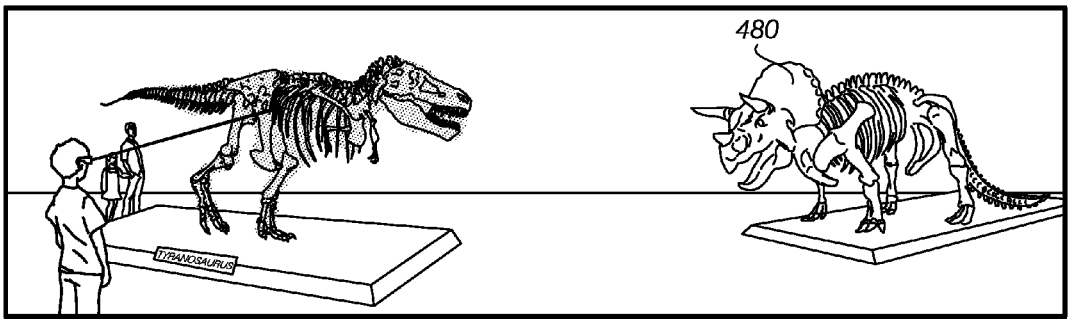
Figure 8G:
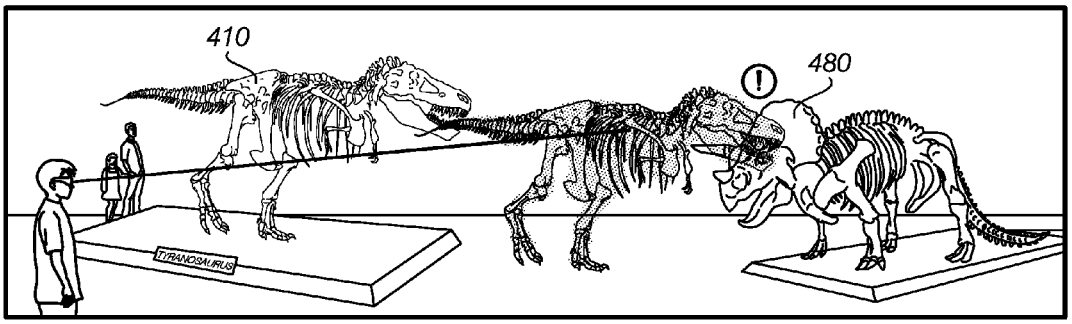
Figure 8H:
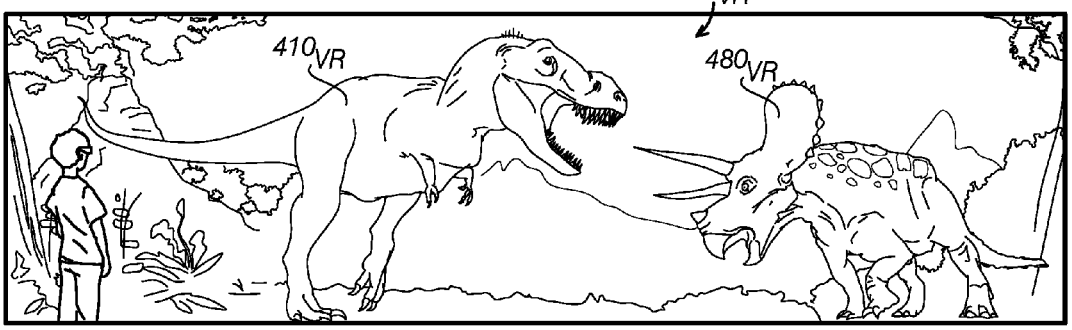

Referring now to FIGS. 8E-8H, it will be appreciated how aspects provide flexibility and robustness in the user's experience through object recognition that can provide an environment with multiple elements interacting together. FIG. 8E shows a second dinosaur skeleton exhibit 480 proximate the skeleton 410. Similar to the experience with the skeleton 410, the user may view the exhibit of the skeleton 480 within an AR scene $490_{AR}$. A virtual menu 430 may be provided again within the user's field of view showing selectable actions for the user. The menu 430 may have selections to modify the previous VR scene $400_{VR}$. For example, as shown in FIGS. 8F-8H, the user may select a function inserting additional objects into the VR scene, or removing certain objects from the VR scene. In this exemplary application, the user selects an option to insert the second dinosaur skeleton 480 into the previous VR scene $400_{VR}$. Once the ambient environment is blocked out from the field of view 420, the device 110 may immerse the user within a new VR scene $490_{VR}$ which contains $410_{VR}$ and $480_{VR}$ (FIG. 8H), placing the user within a synthesized digital environment displaying virtual renditions $410_{VR}$ and $480_{VR}$ of the dinosaurs, and allowing the user to observe for example the two dinosaurs interacting with each other within a pre-historic setting.

The switch between AR and VR may be triggered by one or more of the following user actions. The device 110 may continuously monitor user's hand movement, hand gestures, hand-held controllers or wearable controller, for example through the forward-facing camera 118;518 on the device 110, and activate the switch between AR and VR, or vice versa. The device 110 may continuously monitor audio cues including for example a user's voice command, detected for example through a built-in microphone on the device 110, which may trigger the processor 125 to activate the switch between the AR mode and VR mode, or vice versa. The device 110 may continuously monitor user's body condition, for example through a wireless heart-rate monitor worn by the user, and may activate the switch between AR and VR, for example when the device 110 detects an increase in user's heart rate as a sign of discomfort being inside a fully immersive VR environment. The device 110 may activate as a response, the switch from VR to AR mode in order to alleviate discomfort by reducing immersion.

The device 110 may rely on an internal sensor such as camera 118 and an image sensor (not shown), with the sensor generally looking at the direction of a particular object, such as a 2D surface marker (pedestal of dinosaur) or 3D object marker (dinosaur skeleton) to identify location/ position of the user. With the positional tracked device 110 synthesizing an immersive VR environment, the user is not able to see the real world environment, thus may poses risks such as colliding with real world obstacles (such as walls, other museum visitors, etc.) while fully immersed inside the VR environment. The position of the device 110 may be used to automatically switch from VR to AR mode when it detects the user approaching the real-world obstacles, so that the user could see the real world when necessary and avoid collision.

Figure 9A:
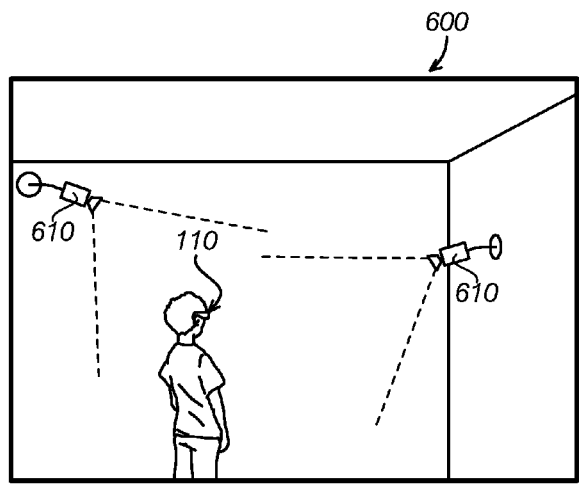
FIG. 9A is a perspective view of an optical tracking system in a room according to an embodiment of the subject technology.
Figure 9B:
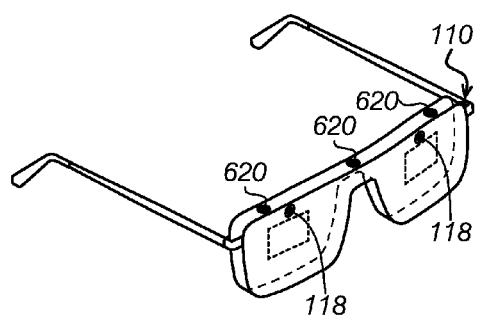
FIG. 9B is a perspective view of a head mounted display device used in the tracking system of FIG. 9A according to an embodiment of the subject technology.

The location of the device 110 may be determined by one or more of the following methods. Referring for example to FIGS. 9A and 9B, the location of the device 110 may be acquired through an external optical-based tracking system 600. The optical-based tracking system 600 may include of one or more tracking cameras 610 capable of capturing a volume inside the real-world environment (for example an office room, a living room, a show room). In some embodiments, the device 110 may include light-emitting modules or markers 620. The one or more tracking cameras 610 pick up the light from the light-emitting modules 620 and the tracking system 600 determines the location of the device using triangulation algorithms. A general computer (not shown) may be connected to the cameras 610 processing the position of the light-emitting modules 620 relative to objects used in the AR/VR experiences, as well as real life objects that may present a collision danger to a user. Some embodiments may include a warning issued to the user if they move too close to potential danger. In some embodiments, the external optical-based tracking system 600 may include one or more tracking cameras 610 and light-reflecting modules 620 may be both attached to the device 110. The one or more tracking cameras 610 are capable of emitting light and the light-reflecting modules 620 are capable of reflecting the camera emitted light in an omni-directional fashion. The one or more tracking cameras 610 are capable of picking up light reflected back from the light-reflecting modules 620. The tracking system 600 calculates and determines the location of the device 110 using triangulation algorithms, then communicates with the device 110 wirelessly to send the tracked position and orientation to the device 110.

Figure 9C:
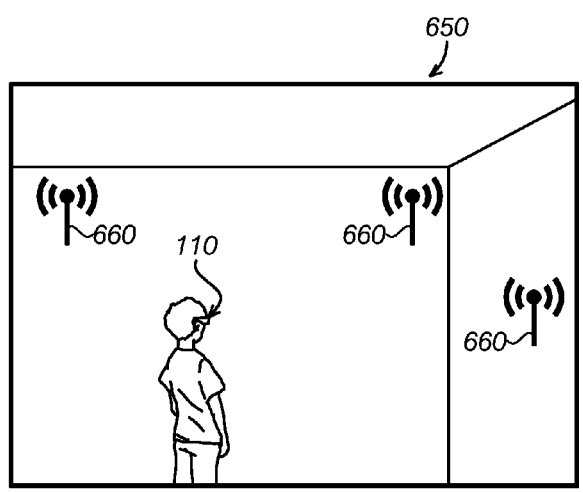
FIG. 9C is a perspective view of a radio frequency tracking system in a room according to an embodiment of the subject technology.
Figure 9D:
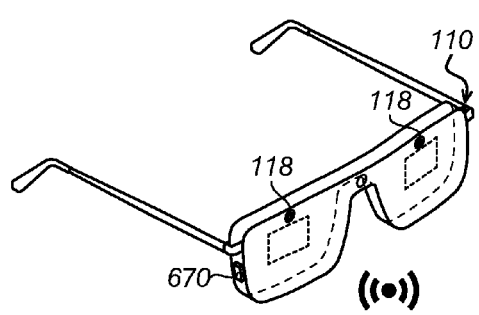
FIG. 9D is a perspective view of a head mounted display device used in the tracking system of FIG. 9C according to an embodiment of the subject technology.

In another embodiment, referring now to FIGS. 9C and 9D, the location of the device 110 may be acquired through triangulation of radio frequency (RF) signals emitted by various RF devices in a tracking system 650. The tracking system 650 may include RF transceivers 660 deployed in the room and RF transceivers 670 on the device 110. The RF transceivers 660 and 670 may include for example Wi-Fi connections, WLAN systems, hotspots and access points, cell phone towers, in-door/out-door Global Positioning Systems (GPS) and beacons, Bluetooth® devices, Near Field Communication (NFC) devices, and Radio-frequency Identification (RFID) devices. The location of the device 110 may be acquired through built-in sensors inside the device and/or additional sensors attached to the device, including for example, an accelerometer, gyroscope, magnetometer, barometer, photodiode and light sensors, speaker(s) and loudspeaker(s), microphone and microphone array, camera and image sensors usually known as charge-coupled devices (CCD) or complementary metal-oxide-semiconductors (CMOS), touch sensors usually known as capacitive sensing devices, mechanical buttons and switches, depth sensors including but not limited to sonar, LIDAR, laser and infrared scanner, and time of flight sensors.

In operation, the 110 device may utilize the video feed(s) acquired from the camera(s) 610 and/or image sensor(s), either built into the device 110 or externally attached to the device 110, to calculate the position, orientation, location and acceleration of the device in reference to one or more known physical objects inside the physical environment. For example, the calculation may be in reference to an image pattern that is printed, projected or displayed on an arbitrary surface, visible to the camera 610 or image sensor but is not necessarily visible to the naked human eye. The arbitrary surface may be for example a piece of paper, display screen, projection surface, or placard. The position, orientation, location and acceleration of the device may be recalculated in the three-dimensional space that is relative to the image pattern's position, orientation, location and acceleration. The calculation may be in reference to a group of image patterns scattered in the physical environment. In the event a subset of the image patterns become non-visible to the device's camera or image sensor, the calculation relies on the rest of the image patterns still in view of the camera or image sensor to extrapolate position. The switch from AR to VR or vice versa may be achieved when the device 110 enters one or more regions inside the three-dimensional space relative to the image pattern(s).

As will be appreciated by one skilled in the art, aspects of the disclosed embodiments may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media may be utilized. In the context of this disclosure, a computer readable storage medium may be any tangible or non-transitory medium that can contain, or store a program for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 125 (FIG. 5) of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In some embodiments, a computer program product may be stored on a variety of computer system readable media. Such media could be chosen from any available media that is accessible by the processor 125, including non-transitory, volatile and non-volatile media, removable and non-removable media. Some embodiments may include system memory integrated into the PCB carrying the processor 125, which could include one or more computer system readable media in the form of volatile memory, such as a random-access memory (RAM) and/or a cache memory. The system memory may include at least one program product having a set (e.g., at least one) of program modules that are configured to carry out the functions of embodiments disclosed above. The program modules generally carry out the functions and/or methodologies of embodiments described.

Although the invention has been discussed with reference to specific embodiments, it is apparent and should be understood that the concept can be otherwise embodied to achieve the advantages discussed. The preferred embodiments above have been described primarily as immersive virtual reality systems and methods for a larger number of concurrent users. In this regard, the foregoing descriptions of the virtual reality environments are presented for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A system for displaying virtual reality (VR) and augmented reality (AR) scenes to a user in a physical environment, the system comprising:
   an electronic digital display; and
   a depth sensor coupled to the digital electronic display;
   a processor in the electronic digital display, the processor configured to:
      display a VR scene or an AR scene to the user in the electronic digital display,
      calculate from data detected by the depth sensor, a position and an orientation of the user within the physical environment relative to a position of the user within the VR scene or AR scene; and
      trigger switching between the VR scene and the AR scene based on the calculated position and calculated orientation data of the user within the physical environment relative to a predetermined position of the user within the VR scene or AR scene.

2. The system for displaying VR and AR scenes to the user of claim 1, wherein the switching between the VR scene and the AR scene is in response to a triggering mechanism activated by the user at the calculated position of the user within the physical environment relative to a position of the user within the VR scene or AR scene, the trigger being triggerable/accessible to the user in either the VR scene or the AR scene.

3. The system for displaying VR and AR scenes to the user of claim 1, further comprising a shuttering mechanism coupled to the electronic digital display, the shuttering mechanism controlled by the processor to be in an "OFF" state in an AR mode, and in an "ON" state in a VR mode.

4. The system for displaying VR and AR scenes to the user of claim 3, wherein the shuttering mechanism is controlled by the processor to:
in the AR mode, display an ambient environment of the user in the display of the AR scene, and
in the VR mode, block display of the ambient environment in the display of the VR scene.

5. The system for displaying VR and AR scenes to the user of claim 1, wherein the processor is configured to display a menu of user actions to the user in either the AR scene or the VR scene.

6. The system for displaying VR and AR scenes to the user of claim 1, wherein the processor is configured to identify a user interaction with an object at the calculated position of the user within the physical environment relative to a position of the user in either the AR scene or the VR scene and switch between the AR scene and the VR scene in response to the identified user interaction.

7. The system for displaying VR and AR scenes to the user of claim 1, wherein the processor is configured to detect one or more user inputs in either the AR scene or the VR scene and switch between the AR scene and the VR scene in response to the detected one or more user inputs, wherein the one or more user inputs may include a user's hand movement, operation of a hand-held controller, operation of a wearable controller, a voice command, and user's body condition.

8. A system for displaying virtual reality (VR) and augmented reality (AR) scenes to a user in a physical environment, the system comprising:
a head mounted unit (HMU);
a camera mounted to the HMU, the camera positioned to capture images of an ambient environment of the user;
an electronic display mounted in the HMU;
a shuttering mechanism in the HMU; and
a processor in the HMU, the processor configured to:
process captured images from the camera,
transmit the captured images of the ambient environment to the electronic display,
display an AR scene or a VR scene to the user in the electronic display, wherein the AR scene incorporating electronically synthesized objects integrated into captured images of the ambient environment, wherein the shuttering mechanism blocks captured images of the ambient environment from the electronic display during display of the VR scene,
coordinate switching between the VR scene and the AR scene via operation of the shuttering mechanism,
detect whether a user's location within the physical environment is within proximity of one of the electronically synthesized objects in the AR scene, and
trigger display of a virtual menu including user commands, within the AR scene in response to the detection of the user's location within proximity of one of the electronically synthesized objects in the AR scene.

9. The system for displaying VR and AR scenes to the user of claim 8, wherein the coordinated switching between the VR scene and the AR scene is in response to a trigger activated by the user, the trigger being triggerable/accessible to the user in either the VR scene or the AR scene.

10. The system for displaying VR and AR scenes to the user of claim 8, wherein the processor is configured to alter a virtual object in the VR scene or alter one of the electronically synthesized objects in the AR scene in response selecting an action from the virtual menu of user commands.

11. The system for displaying VR and AR scenes to the user of claim 8, wherein the processor is configured to identify a user interaction with a virtual object in the VR scene or one of the electronically synthesized objects in the AR scene and switch between the AR scene and the VR scene in response to the identified user interaction.

12. The system for displaying VR and AR scenes to the user of claim 8, wherein the processor is configured to detect one or more user inputs in either the AR scene or the VR scene and switch between the AR scene and the VR scene in response to the detected one or more user inputs, wherein the one or more user inputs may include a user's hand movement, operation of a hand-held controller, operation of a wearable controller, a voice command, and user's body condition.

13. The system for displaying VR and AR scenes to the user of claim 8, wherein the shuttering mechanism comprises liquid crystal shutter lenses, wherein the liquid crystal shutter lenses are controlled by the processor to be opaque during display of the VR scene.

14. The system for displaying VR and AR scenes to the user of claim 13, wherein the liquid crystal shutter lenses are controlled by the processor to lighten from being opaque during display of the AR scene.

15. A method of displaying virtual reality (VR) and augmented reality (AR) scenes to a user in a physical environment viewing a digital display, comprising:
displaying a VR scene or an AR scene to the user through the digital display;
detecting by a processor whether the user is being displayed the VR scene or the AR scene in the digital display;
calculating from image data received by a camera and orientation data received from an orientation sensor coupled to the digital display, a position and an orientation of the user within the physical environment relative to a position of the user within the VR scene or AR scene; and
triggering, by the processor, switching between display of the VR scene and the AR scene in the digital display based on the calculated position and calculated orientation data of the user within the physical environment relative to a predetermined position of the user within the VR scene or AR scene.

16. The method of claim 15, further comprising:
detecting by the processor a user action within the VR scene or the AR scene;
determining by the processor whether the detected user action is flagged for transitioning between display of the VR scene and display of the AR scene; and
switching between display of the VR scene and display of the AR scene, in response to the processor determining the detected user action is flagged for transitioning between the VR scene and the AR scene.

17. The method of claim 15, further comprising continuing display of the VR scene or display of the AR scene in response to the processor determining the detected user interaction is not flagged for transitioning between the VR scene and the AR scene.

18. The method of claim 15, further comprising:
displaying an ambient environment of the digital display in the display of the AR scene;
operating a shuttering mechanism to block display of the ambient environment of the digital display during display of the VR scene.

19. The method of claim 18, further comprising:
detecting, by the processor, a switch from display of the VR scene to the AR scene; and
operating the shuttering mechanism to open and allow display of the ambient environment of the digital display during display of the AR scene.

20. The method of claim 15, further comprising:
inserting, by the processor, objects acquired inside the AR scene in the VR scene; and
inserting, by the processor, objects displayed inside the VR scene in the AR scene.

* * * * *